(12) United States Patent
Baba et al.

(10) Patent No.: US 6,400,529 B1
(45) Date of Patent: Jun. 4, 2002

(54) INTEGRATED CIRCUIT CHIP SUPPORTING AND ELECTRICALLY CONNECTING A HEAD SLIDER

(75) Inventors: Shunji Baba; Hidehiko Kira; Norio Kainuma; Toru Okada, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,683

(22) Filed: Mar. 20, 2000

(30) Foreign Application Priority Data

Jul. 2, 1999 (JP) .......................................... 11-189282

(51) Int. Cl.[7] .................................................. G11B 5/76
(52) U.S. Cl. ..................................................... 360/234.4
(58) Field of Search ............................ 360/234.5, 234.4

(56) References Cited

U.S. PATENT DOCUMENTS 3,591,733 A * 7/1971 Pflughaupt ................ 360/234.4
4,789,914 A * 12/1988 Ainslie et al. ............ 360/234.4
5,712,747 A * 1/1998 Voldman et al. .......... 360/234.4

FOREIGN PATENT DOCUMENTS

JP 4047511 2/1992
JP 10124839 5/1998

* cited by examiner

Primary Examiner—David Davis
(74) Attorney, Agent, or Firm—Greer, Burns & Crain, LTD

(57) ABSTRACT

A head assembly has a head slider including a magnetic head and a first electrode, an IC chip supporting the head slider on a principal surface of the IC chip, and a suspension supporting the IC chip, the IC chip comprising a second electrode and a third electrode on the principal surface thereof, the third electrode being connected to the suspension, the second electrode being electrically connected to the first electrode.

15 Claims, 12 Drawing Sheets

INTEGRATED CIRCUIT CHIP SUPPORTING AND ELECTRICALLY CONNECTING A HEAD SLIDER

BACKGROUND OF THE INVENTION

1. Field of the Invention

The present invention relates generally to a head assembly and disk drive having same.

2. Description of the Related Art

Generally, a hard disk drive has a head assembly positioned at the tip of an arm driven by an actuator. The head assembly is composed of a head slider mounted on a suspension together with an integrated circuit, or IC, chip. The head slider has a magnetic head formed using thin film technology. The magnetic head is composed of an inductive head and a magneto-resistive head, hereinafter referred to as an MR head. The inductive head writes information to a hard disk and the MR head reads recorded information from the hard disk. The head IC chip has the function of, for example, amplifying a microsignal read by means of the MR head.

Attendant upon recent improvements, that is, increases, of the frequency of the data signals handled by data processing devices, there is a demand for hard disk drives capable of reading and writing high data-signal frequencies of for example 200–300 MHz, well in excess of the current 70 MHz standard. As can be appreciated by those skilled in the art, raising the data signal write frequency necessitates increasing the data signal transfer rate. Increasing the data signal transfer rate in turn requires physically reducing the distance from the head slider to the IC chip, thus minimizing inductance and electrostatic capacitance along the signal transmission path between the head slider and the head IC chip.

Additionally, the head assembly must be one that can be produced using production techniques currently in use or under development.

Figure 1A:
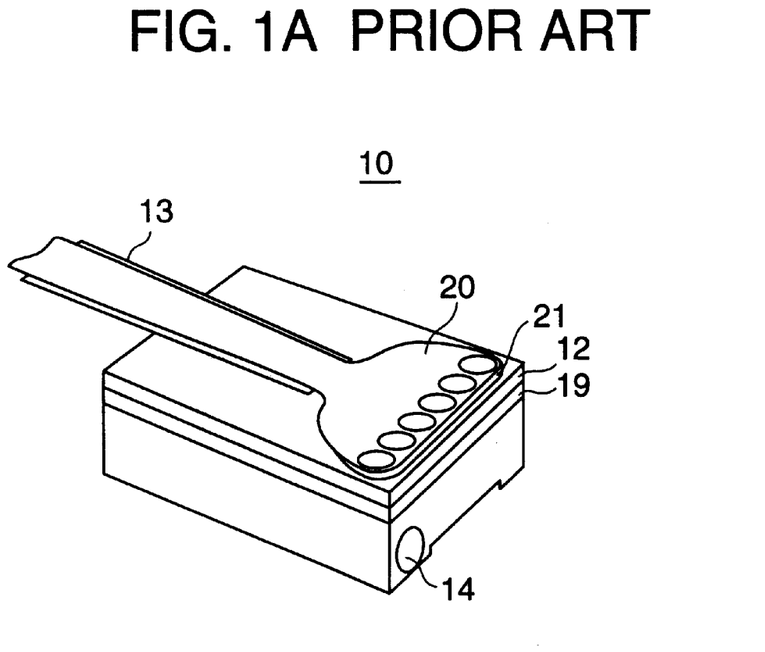
FIGS. 1A and 1B are diagrams showing a conventional head assembly.
Figure 1B:
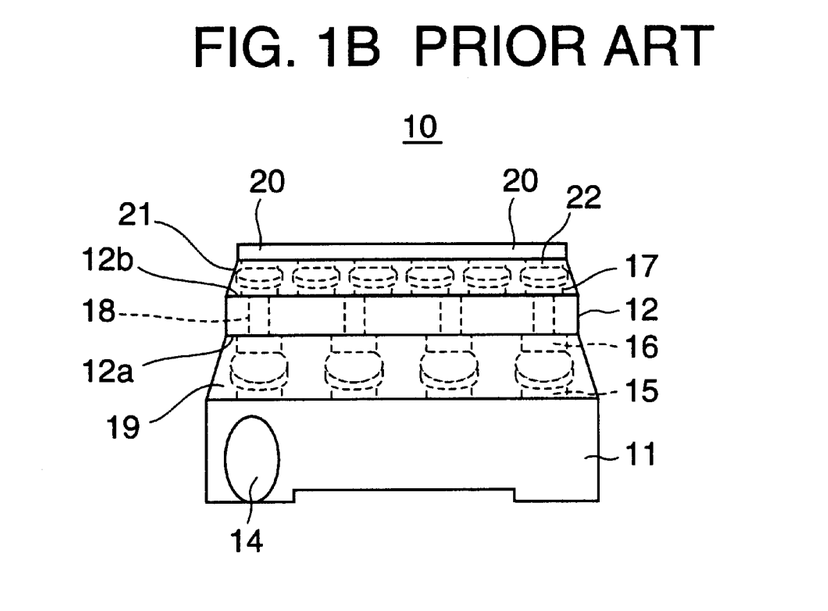

FIGS. 1A and 1B show a head assembly 10 described in Japanese Laid-Open Patent App. No. 10-124839. A head slider 11 is joined to a head IC chip 12 and the head IC chip 12 is fixedly mounted on a suspension 13.

The head IC chip 12 comprises a lower surface 12a, an integrated circuit part and a wire pattern (neither of which is shown in the drawing), an electrode 16, an upper surface 12b and another electrode 17, the electrodes 16 and 17 being connected by a through hole 18.

The head slider 11 is affixed to the lower surface 12a of the IC chip 12 using an adhesive agent 19. The electrodes 15 and 16 are electrically connected to each other. A flexible cable 20 is affixed to the upper surface 12b of the head IC chip 12 using another adhesive agent 21. The electrode 17 and an electrode 22 of the flexible cable 20 are electrically connected to each other.

According to the above-described head assembly 10, the physical distance separating the head slider 11 and the head IC chip 12 is essentially eliminated, making it possible to greatly increase the transfer rate of the data signal.

However, referring to the head IC chip 12, it can be appreciated that the electrode 17 must be formed on a surface opposite a surface on which the integrated circuit part is formed, and, further, one or more holes must be opened in a silicon wafer to form one or more through holes 18. Yet the formation of the electrode 17 on the surface opposite the surface on which the integrated circuit part is formed and the opening of one or more holes in a silicon wafer is either very difficult or virtually impossible, and accordingly, the head IC chip 12 described above is essentially impossible to produce.

Figure 2:
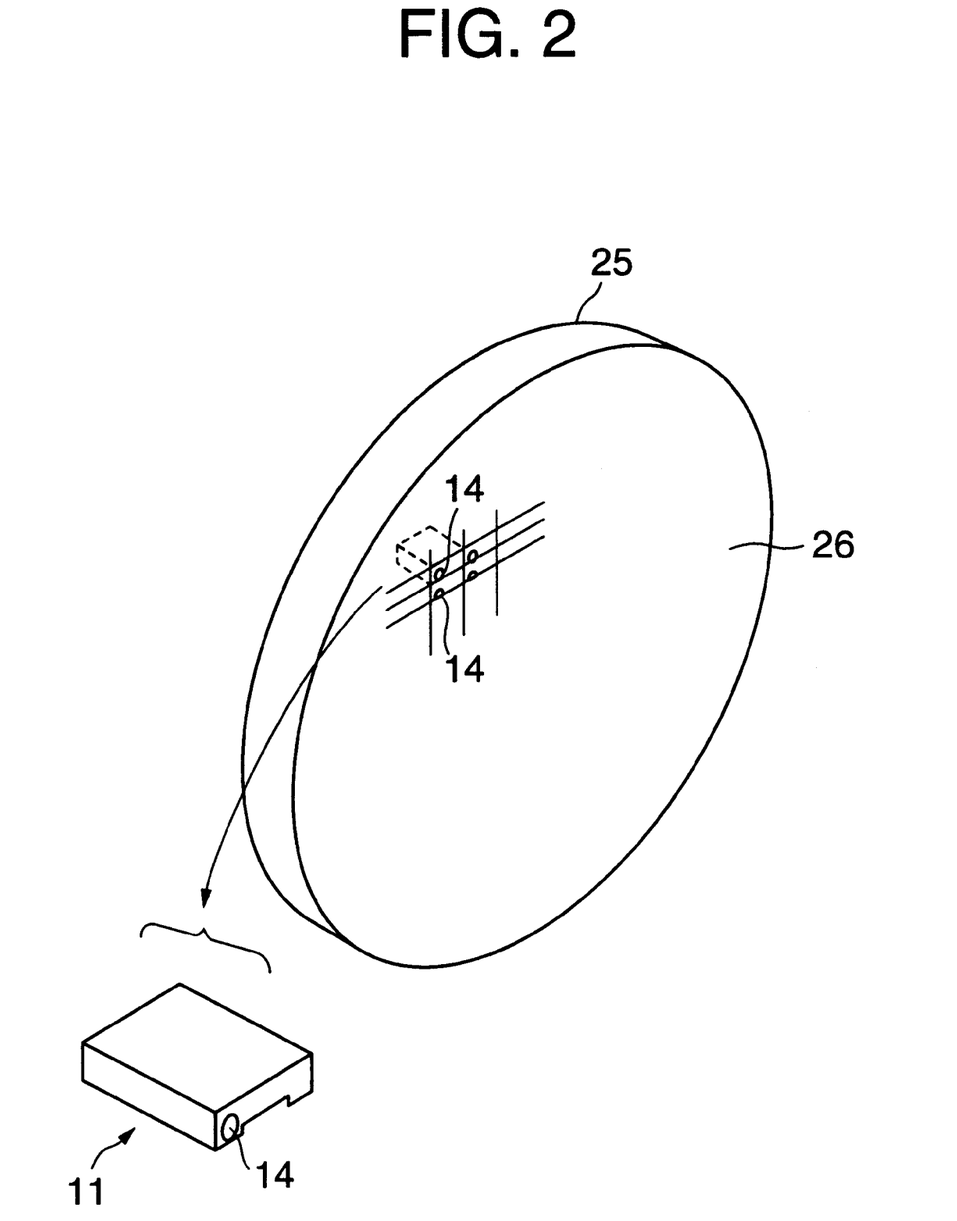
FIG. 2 is a diagram for explaining how a head slider is manufactured.

Additionally, referring to the common method by which the head slider 11 is produced, it should be noted that, as shown in FIG. 2, a plurality of magnetic heads 14 are arranged in the form of a matrix on a surface 26 of a wafer 25. The wafer 25 is then cut along the matrix so as to cut out individual sliders 11. As can be appreciated, the electrode 15 on the head slider 11 as shown in FIG. 1B is formed on a surface different from the surface on which the magnetic head 14 is formed. The surface on which the electrode 15 is formed is not the surface 26 of the wafer 25 but is instead the surface that first appears once the wafer 25 has been cut along the matrix and the individual sliders 11 cut out. Accordingly, the electrodes 15 are formed on each individual slider 11 cut from the wafer 25. Additionally, the length of the longest side is small, that is, approximately 1 mm. Accordingly, it is very difficult to form the electrodes 15 on the surfaces of individual head sliders 11 and hence it is exceedingly difficult and substantially impossible to produce the head slider 11.

Accordingly, the head assembly 10, too, is essentially impossible to mass produce.

Additionally, referring to the adhesive agent 19, it can be appreciated that because the adhesive agent 19 is injected into a gap between the head slider 11 and the head IC chip 12 after electrodes 15 and 16 have been connected to each other, there is a possibility that air bubbles may be trapped therewithin, thus reducing the strength of the bond between the head slider 11 and the head IC chip 12.

SUMMARY OF THE INVENTION

Accordingly, it is a general object of the present invention to provide an improved and useful head assembly and disk drive having same, wherein the foregoing problems are eliminated, Another object of the present invention is to provide an improved and useful head assembly and disk drive having same, wherein the head assembly can be produced without undue difficulty.

Still another object of the present invention is to provide an improved and useful head assembly and disk drive having same, wherein the bonding of the head slider to the head IC chip is improved.

The above-described objects of the present invention are achieved by a head assembly comprising:

- a head slider including a magnetic head and a first electrode;
- an IC chip supporting the head slider on a principal surface of the IC chip; and
- a suspension supporting the IC chip, the IC chip comprising a second electrode and a third electrode on the principal surface thereof, the third electrode being connected to the suspension, the second electrode being electrically connected to the first electrode.

Additionally, the above-described objects of the present invention are also achieved by a disk drive comprising:

- a recording medium;
- an arm driven by an actuator; and
- a head assembly that rotates together with the arm, the head assembly comprising:
  - a head slider including a magnetic head and a first electrode;
  - an IC chip supporting the head slider on a principal surface of the IC chip; and a suspension supporting the IC chip,
the IC chip comprising a second electrode and a third electrode on the principal surface thereof, the third electrode being connected to the suspension, the second electrode being electrically connected to the first electrode.

Additionally, the above-described objects of the present invention are also achieved by an IC chip, the IC chip supporting a head slider including a magnetic head and a first electrode on a principal surface of the IC chip, a suspension supporting the IC chip, the IC chip having a size larger than a size of the head slider, the principal surface of the IC chip including an area for supporting the head slider and a second electrode electrically connected to the first electrode of the head slider and a third electrode electrically connected to the suspension, the second electrode and the third electrode provided at an area outside the area for supporting the head slider.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention with reference to the accompanying drawings, specifically in the first instance FIG. 3.

Figure 3:
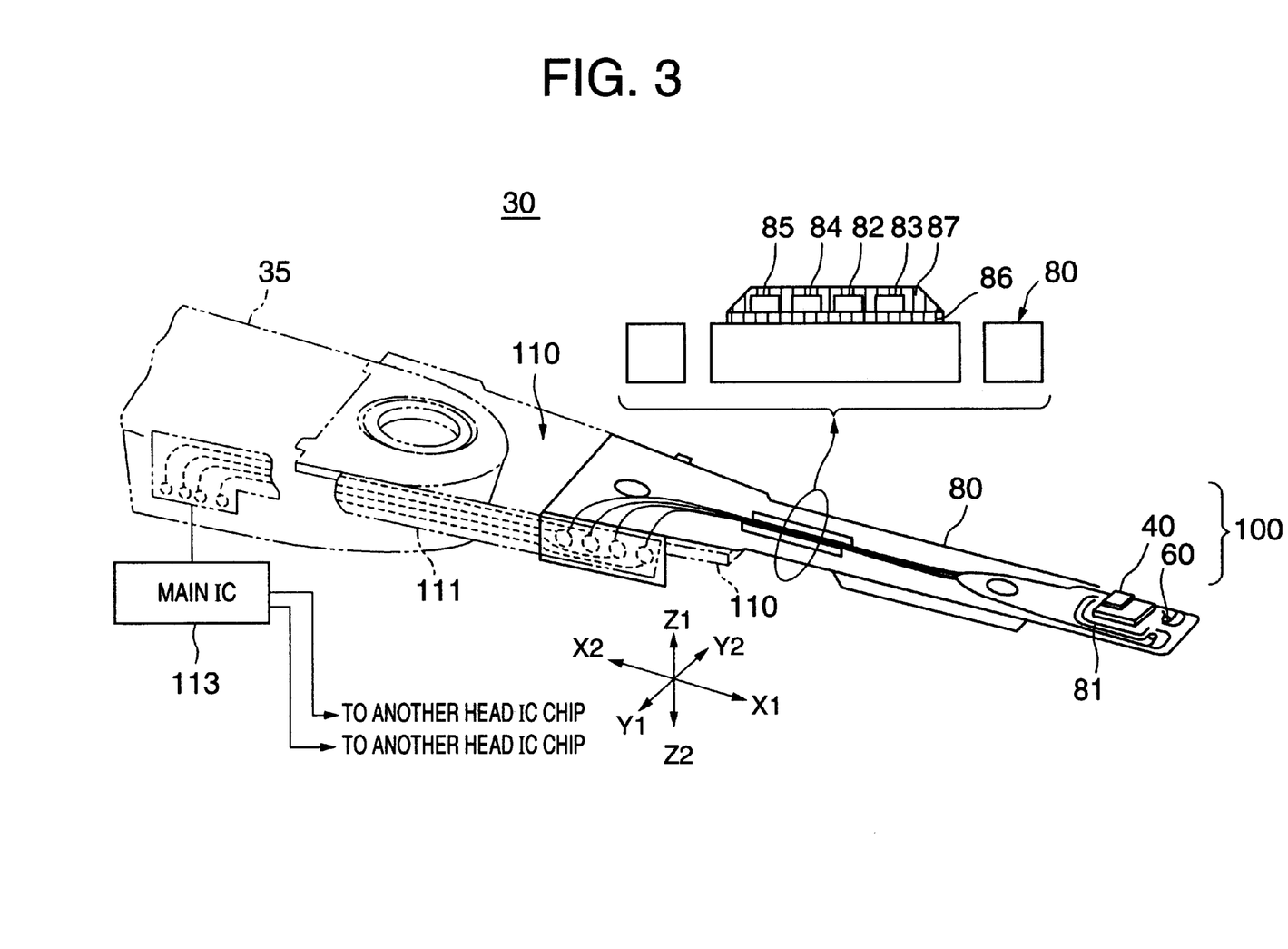
FIG. 3 is a diagram showing an oblique view of a magnetic head assembly according to a first embodiment of the present invention.
Figure 9A:
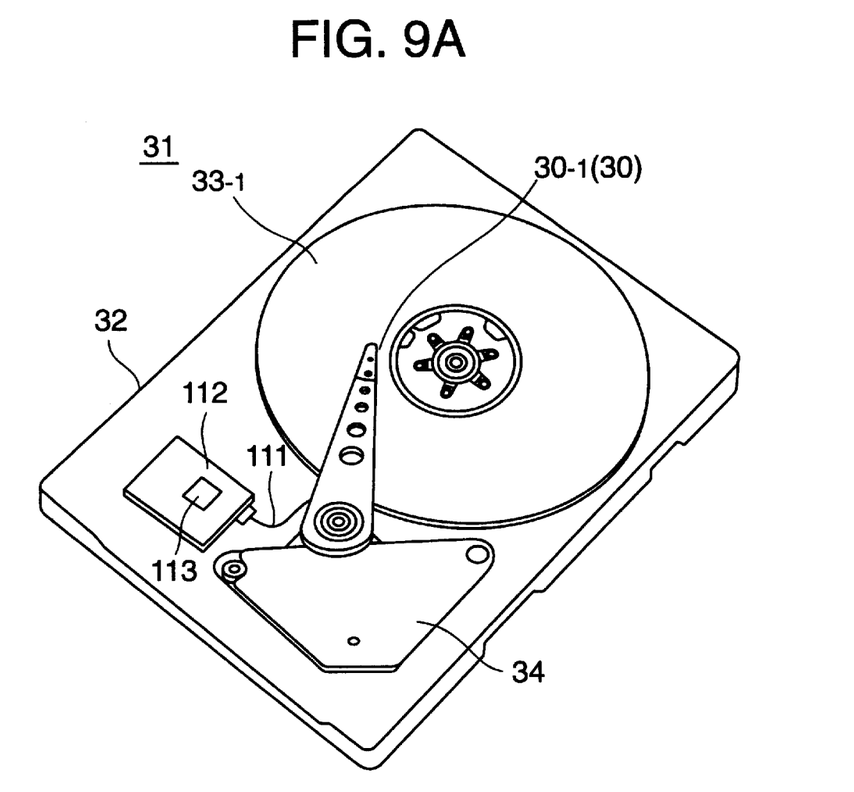
FIGS. 9A and 9B are diagrams showing a hard disk drive having the head assembly shown in FIG. 3.
Figure 9B:
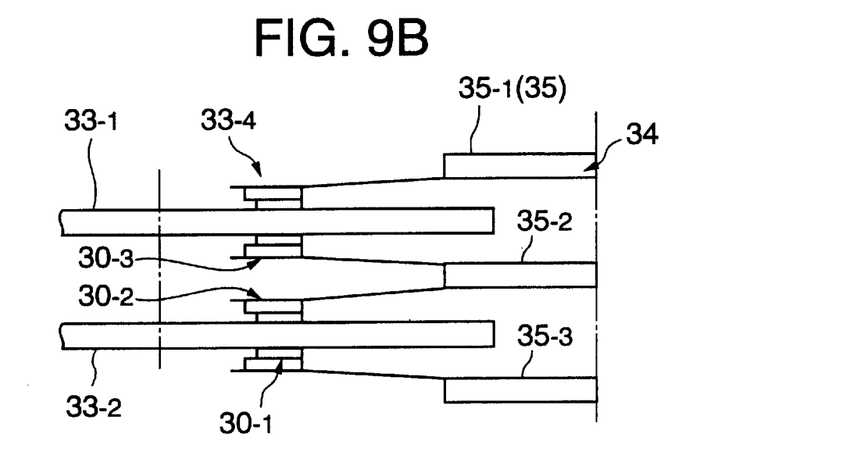

FIG. 3 shows an oblique view of a magnetic head assembly 30 according to a first embodiment of the present invention, hereinafter referred to as a head assembly. It should be noted that FIGS. 9A and 9B show a hard disk drive 31 having the head assembly shown in FIG. 2. For ease of explanation, a brief description will first be given of the hard disk drive 31.

As shown in FIGS. 9A and 9B, the hard disk drive 31 comprises a housing 32, within which are provided, for example, two rotating hard disks 33-1, 33-2, an actuator 34 having a coil and a permanent magnet and which is electromagnetically driven, arms 35-1, 35-2, 35-3 swung by the actuator 34, and head assemblies 30-1, 30-2, 30-3, 30-4 mounted on the tips of the actuators 35-1, 35-2, 35-3. The hard disks 33-1, 33-2 swing, the actuator 34 is activated, the arms 35-1, 35-2, 35-3 returnably rotate, the head assemblies 30-1 through 30-4 are moved in a direction of a radius of the hard disks 33-1, 33-2 so as to access a predetermined track and record information to and read information from the hard disks 33-1, 33-2.

Each of the head assemblies 30-1 through 30-4 has the same composition, so hereinafter reference numeral 30 is used as a designation thereof when not referring to any one specific head assembly.

A description will now be given of the head assembly 30, with reference to the accompanying drawings, specifically FIGS. 3, 4 and 5.

FIG. 3 shows an oblique view of a magnetic head assembly according to a first embodiment of the present invention. FIG. 4 shows an enlarged view of an essential part of the head assembly of FIG. 3. FIG. 5 is a cross-sectional view along a line V—V shown in FIG. 4.

As shown in the diagrams, the head assembly 30 comprises a head slider 40, head IC chip 60 and suspension 80. More specifically, a head slider/head IC chip assembly 100 comprising the head slider 40 and head IC chip 60 Is fixedly mounted on the suspension 80.

Figure 4:
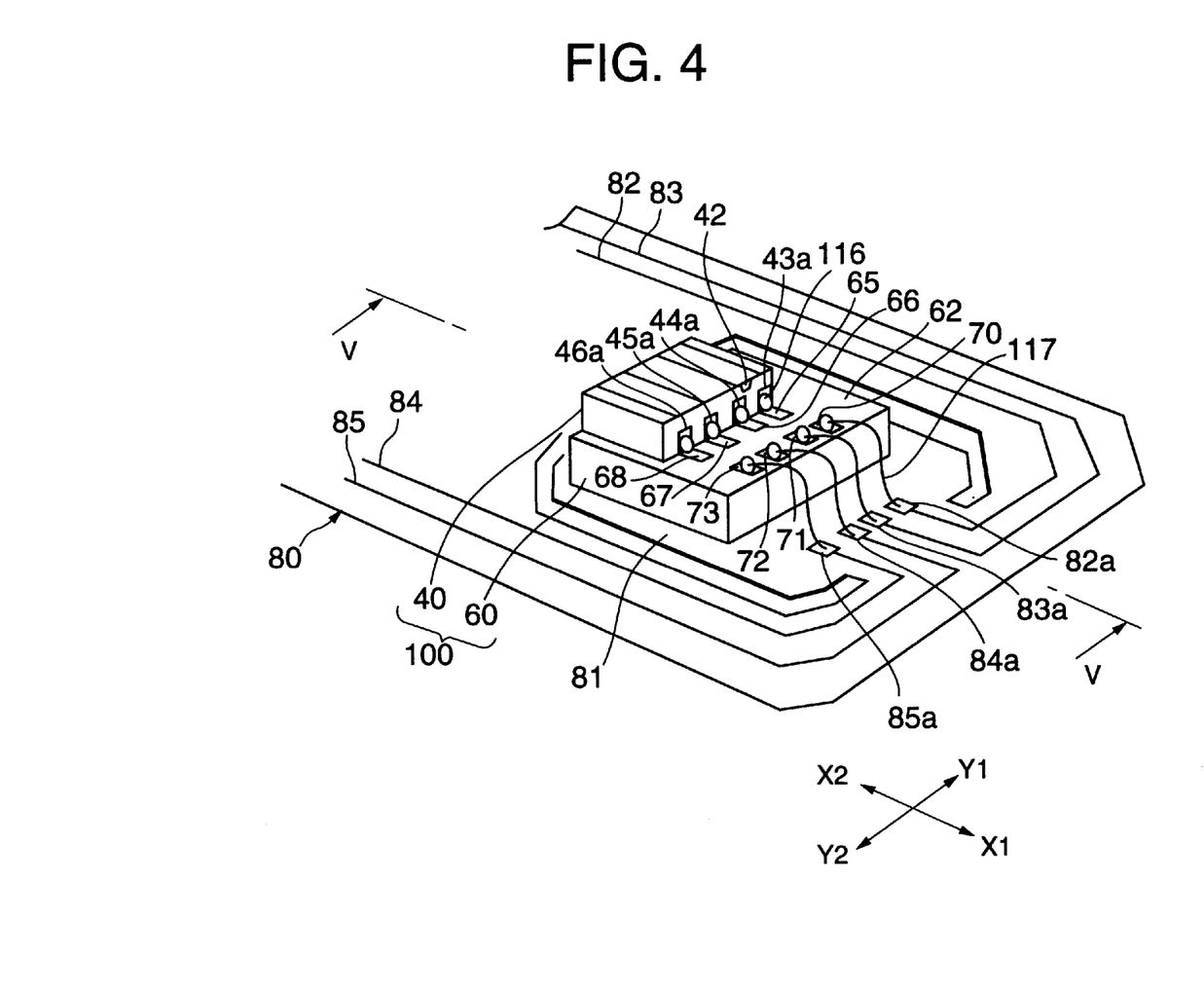
FIG. 4 is an enlarged view of an essential part of the head assembly of FIG. 3.
Figure 5:
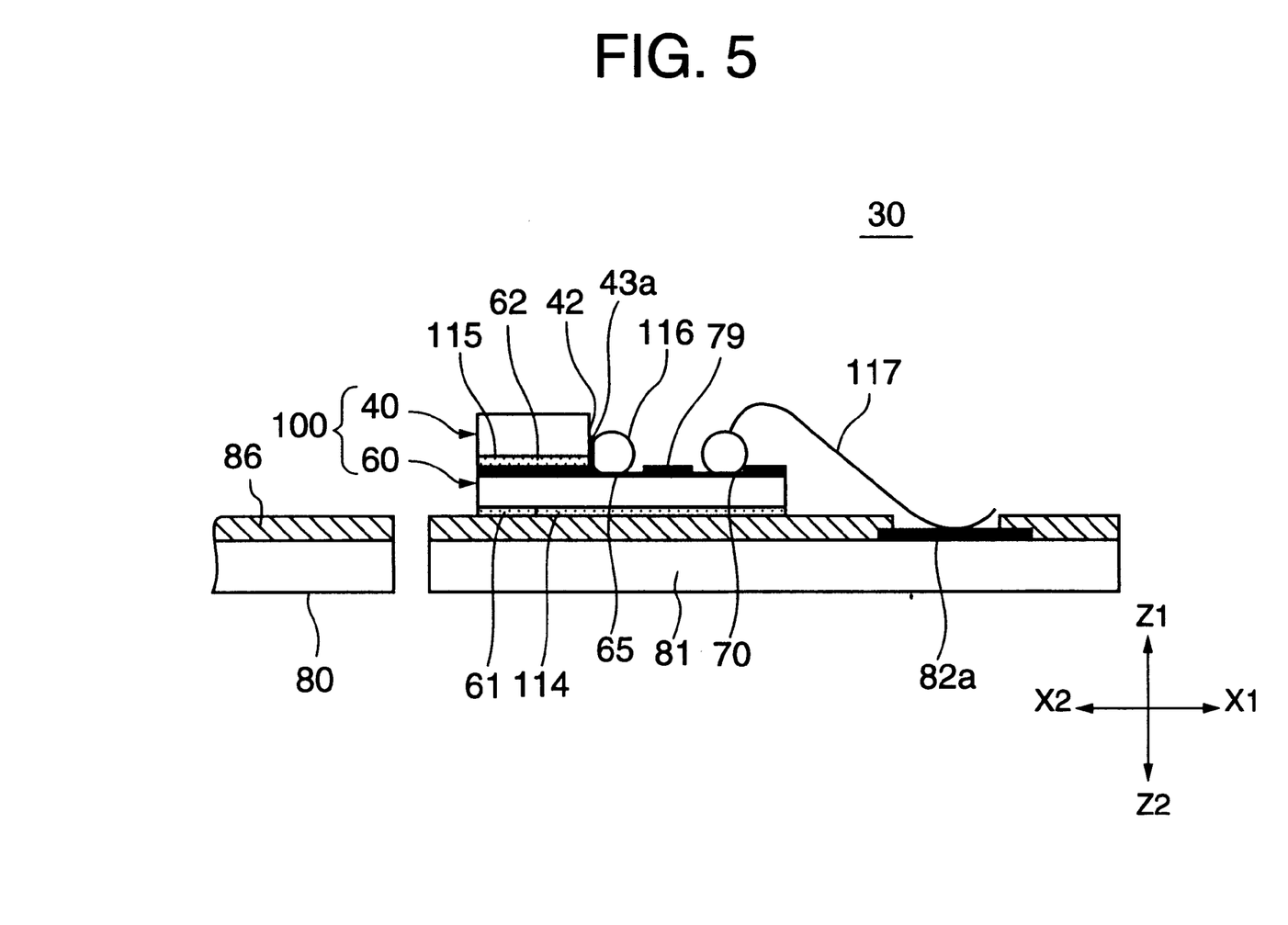
FIG. 5 is a cross-sectional view along a line V—V shown in FIG. 4.

It should be noted that in FIGS. 3, 4 and 5, an X1 direction is toward a tip of the suspension 80 and an X2 direction is toward a base of the suspension 80. A Y1, Y2 direction represents a width of the suspension 80, that is, the head assembly 30. A Z1, Z2 direction represents a height of the head assembly 30.

An intermediate member, that is, a spacer 110, is fixedly mounted on a base side of the suspension 80, the spacer 110 being fixedly mounted at a tip of the arm 35.

A flexible printed cable 111 is extended from the head assembly 30. The flexible printed cable 111 is connected to a circuit board module 112 and is electrically connected to a main IC 113 on the circuit board module 112. The main IC 113 has recording, reproduction and amplifying circuits. Other flexible printed cables extending from other head assemblies are similarly connected to the main IC 113.

The suspension 80 is made from a thin stainless steel plate, at the tip of which a gimbal 81 is provided. A plurality of copper wire patterns 82, 83, 84, 85 for signal transmission are formed on a top surface of the suspension 80. The wire patterns 82, 83, 84, 85 are formed on top of a polyimide layer 86 itself formed on top of the stainless steel plate that composes the suspension, and are covered by another polyimide layer 87 for protection. One end of the wiring patterns 82, 83, 84, 85 are extended to the gimbal 81 and has electrodes 82a, 83a, 84a and 85a. The other end of the wiring patterns 82, 83, 84, 85 extends to the base of the suspension 80 and is connected to the flexible printed cable 111.

The head slider/head IC chip assembly 100 has a structure wherein, using an adhesive agent 115, the head slider 40 is affixed to and fixedly mounted on the top surface of the head IC chip 60, thus directly joining the head slider 40 and the head IC chip 60 to each other.

The head slider/head IC chip assembly 100 is mounted on the suspension by putting an adhesive agent 114 on a bottom surface of the head IC chip 60 of the head slider/head IC chip assembly 100 and affixing the head slider/head IC chip assembly 100 to the gimbal 81 of the suspension 80.

The adhesive agents 114, 115 described above may, for example, be an epoxy-type thermosetting adhesive, an anaerobic adhesive that sets instantaneously, or a two-part adhesive.

Figure 6:
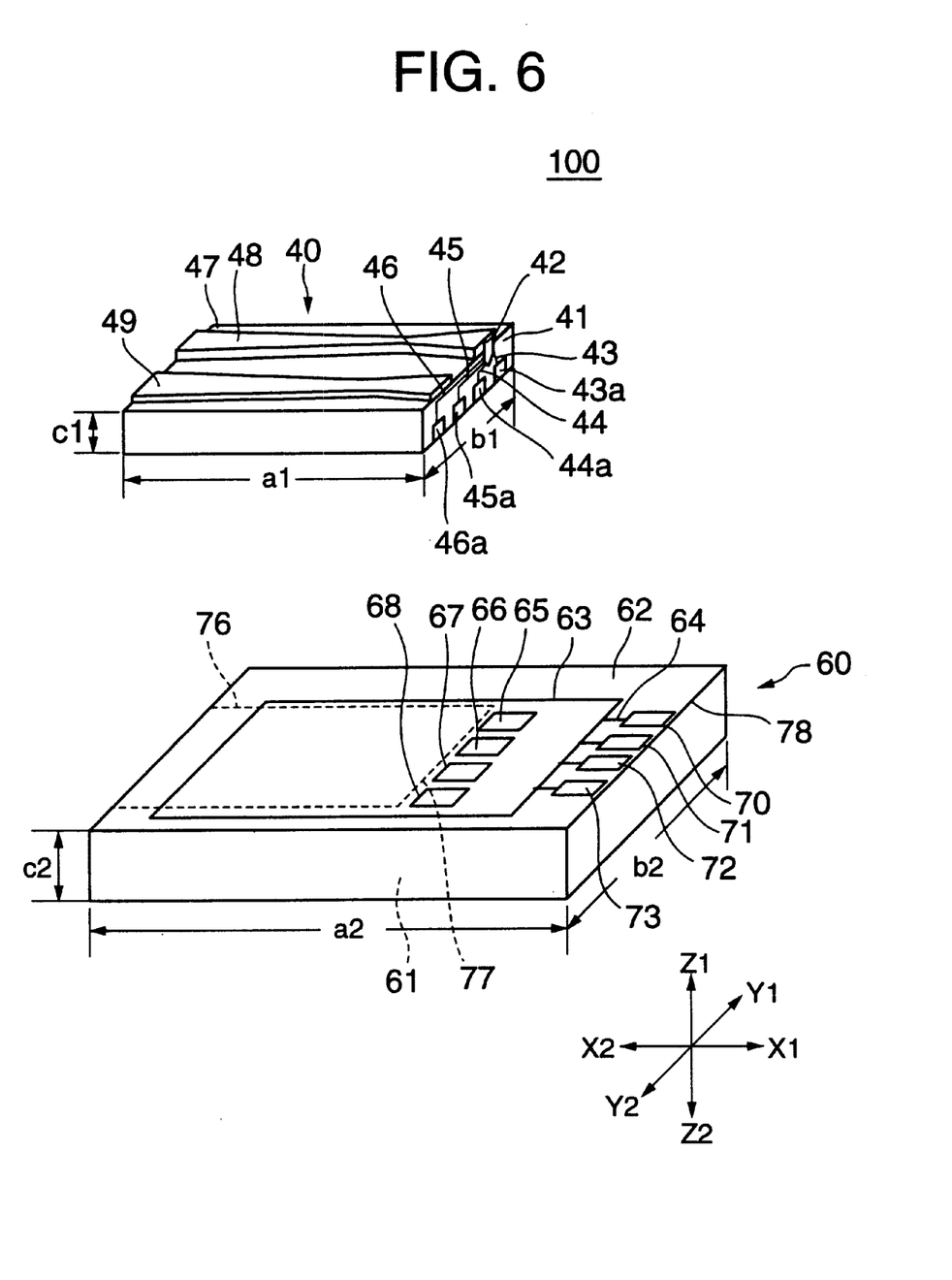
FIG. 6 is an exploded oblique view of the head slider/head IC chip assembly.

FIG. 6 is an exploded oblique view of the head slider/head IC chip assembly 100. As shown in the diagram, the head slider 40 has a volume, or size, defined by length a1 X width b1 X height c1. On a side edge surface 41 in the X1 direction of the head slider 40 there are formed a magnetic head 42, wire patterns 43, 44, 45, 46 and four electrodes 43a, 44a, 45a, 46a. Rails 48, 49 are formed on a top surface 47 of the head slider 40. The magnetic head 42 is formed using thin-film technology, and is composed so that an inductive head and a MR head (neither of which is shown in the drawing) are disposed one atop the other. Two wire patterns 43, 44 are extended from the inductive head, with electrodes 43a, 44a provided at the other ends of the two wire patterns 43, 44, respectively. Two other wire patterns 45, 46 are extended from the MR head, with electrodes 45a, 46a provided at the other ends of the two wire patterns 45, 46, respectively.

The electrodes 43a, 44a, 45a, 46a are disposed in a predetermined arrangement in the Y1, Y2 direction.

Additionally, as also shown in FIG. 6, the head IC chip 60 has a volume, or size, defined by length a2×width b2×height c2. The area of the head IC chip 60 defined by length a2×width b2 is approximately twice the area of the head slider 40 described above.

The head IC chip 60 has a top surface (or first surface) 62 and a bottom surface (or second surface) 61. On only the top surface 62 are formed an integrated circuit 63, a wire pattern 64, electrodes 65, 66, 67, 68 for connecting the head slider and electrodes 70, 71, 72, 73 for connecting the suspension. Nothing is formed on the bottom surface 61 of the head IC chip 60. Accordingly, the head IC chip 60 can be produced efficiently and reliably by performing processes on a single surface of the wafer, using the same production process used to manufacture ordinary IC chips.

Reference number 76 represents a head slider mounting area for mounting the head slider 40, and is disposed toward the X2 end of the head IC chip 60. Reference number 77 represents a borderline extending in the Y1, Y2 direction at the X1 end of the head slider mounting area 76.

The head slider connecting electrodes 65, 66, 67, 68 for connecting the head slider and the suspension connecting electrodes 70, 71, 72, 73 for connecting the suspension are formed on the top surface 62 of the head IC chip 60 yet outside the head slider mounting area 76, more specifically, in an area extending beyond the head slider mounting area 76 on the X1 side of the top surface 62 of the head IC chip 60. Accordingly, in a state in which the head slider 40 is mounted on the head slider mounting area 76 of the top surface 62 of the head IC chip 60, the head slider connecting electrodes 65, 66, 67, 68 and the suspension connecting electrodes 70, 71, 72, 73 are not covered by the head slider 40 but instead remain exposed. Accordingly, as will be described later, the electrical connections between the electrodes 43a, 44a, 45a, 46a and the head slider connecting electrodes 65, 66, 67, 68, and between the suspension connecting electrodes 70, 71, 72, 73 and the electrodes 82a, 83a, 84a, 85a, are made using an area of the top surface 62 of the head IC chip 60 that is outside the head slider 40 mounted thereon.

The suspension connecting electrodes 70, 71, 72, 73 are aligned along the X1 edge 78 of the head IC chip 60. The head slider connecting electrodes 65, 66, 67, 68 and the suspension connecting electrodes 70, 71, 72, 73 are electrically connected to each other by using the wire pattern 64.

Reference number 79, seen for example in FIG. 5, is a protective layer that covers the entire top surface 62 of the head IC chip 60 except for the head slider connecting electrodes 65, 66, 67, 68 and the suspension connecting electrodes 70, 71, 72, 73. Accordingly, the head slider 40 is affixed to the head slider mounting area 76 of the top surface 62 of the head IC chip 60 without damaging the integrated circuit 63.

The head slider connecting electrodes 65, 66, 67, 68 are aligned along the borderline 77 of the head slider mounting region 76 so as to correspond to electrodes 43a, 44a, 45a, 46a. Accordingly, as shown in FIGS. 4 and 5, in a state in which the head slider 40 is affixed to the head slider mounting area 76 on the top surface 62 of the head IC chip 60, electrodes 43a, 44a, 45a, 46a are positioned so as to correspond at right angles to head slider connecting electrodes 65, 66, 67, 68. Accordingly, electrodes 43a, 44a, 45a, 46a and head slider connecting electrodes 65, 66, 67, 68 are electrically connected to each other by a gold (Au) ball 116 formed by a wire bonding method. The gold ball 116 does not project beyond the rails 47, 48 of the head slider 40. A conductive member other than the gold ball 116 may be used.

The suspension connecting electrodes 70, 71, 72, 73 and electrodes 82a, 83a, 84a, 85a are electrically connected to each other by a gold wire 117 bonded so as to form an arc-shaped bridge.

It should be noted that that the head IC chip 60 may alone be covered in a resin.

A description will now be given of methods of assembling the above-described head assembly 30.

Figure 7:
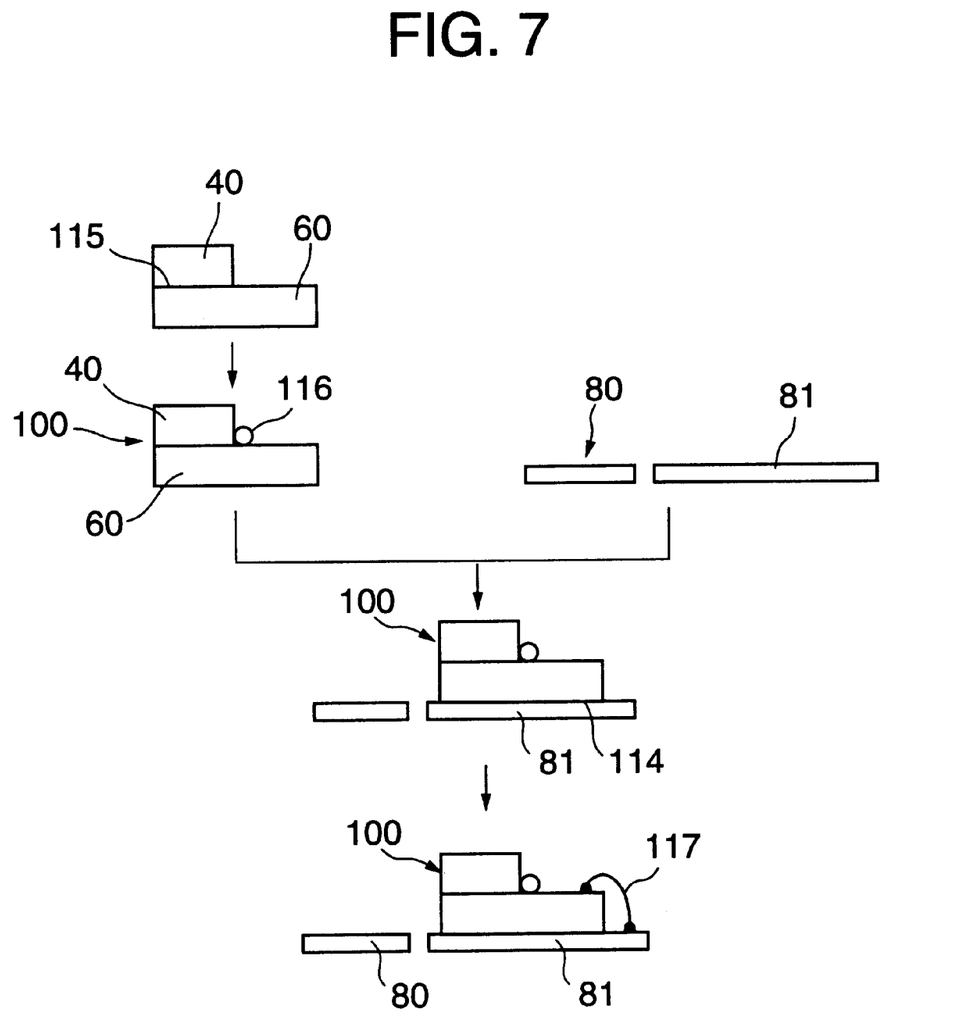
FIG. 7 shows one method for assembling the head assembly shown in FIG. 3.

FIG. 7 shows one method for assembling the head assembly 30 shown in FIG. 3. As shown in the diagram, the head assembly 30 is assembled by affixing the head slider 40 onto the head IC chip 60, putting a gold ball 116 so as to assemble the head slider/head IC chip assembly 100 and then affixing the head slider/head IC chip assembly 100 to the gimbal 81 of the suspension 80 and, finally, bonding a gold wire 117.

Figure 8:
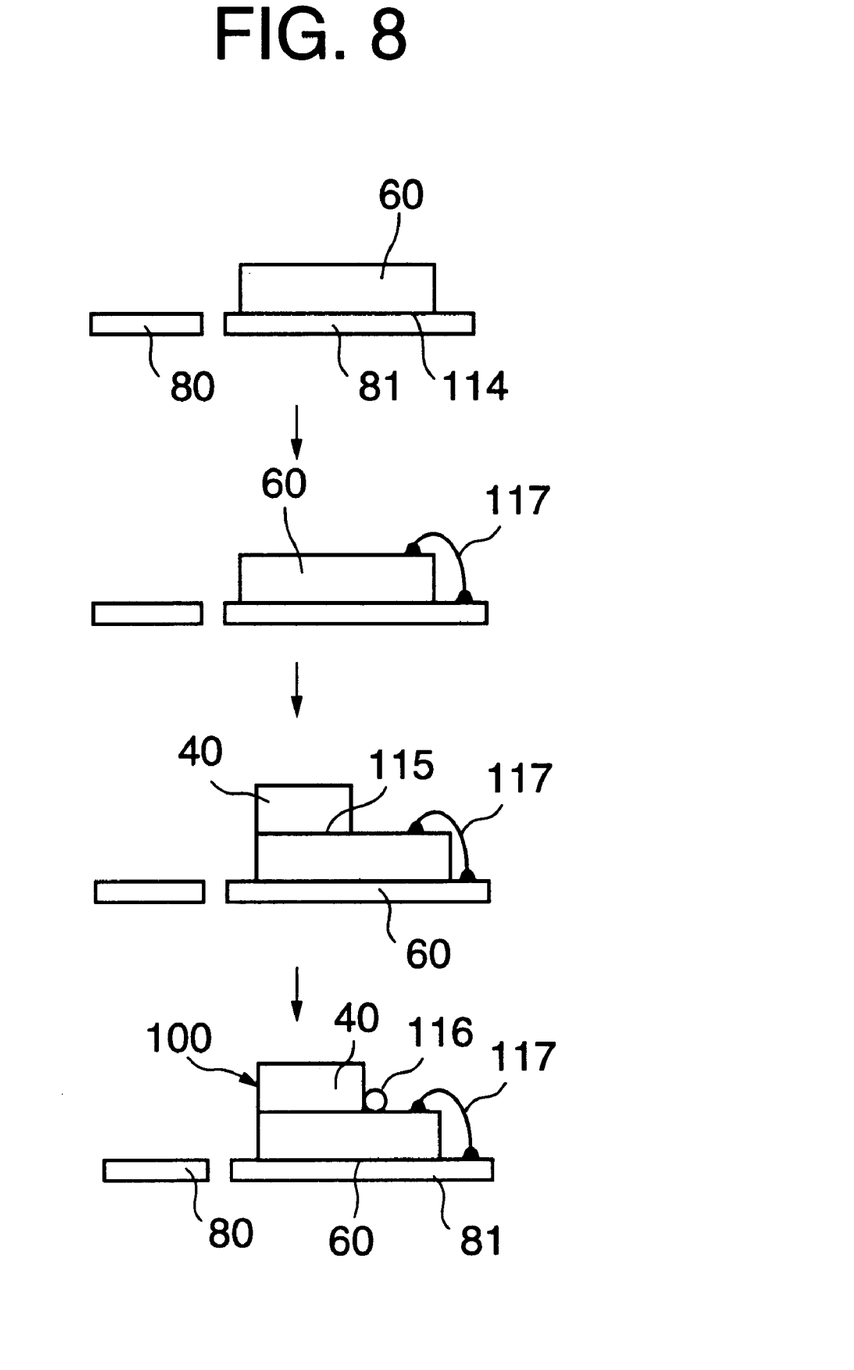
FIG. 8 shows another method for assembling the head assembly shown in FIG. 3.

FIG. 8 shows another method for assembling the head assembly 30 shown in FIG. 3. As shown in the diagram, the head IC chip 60 is affixed to the gimbal 81 of the suspension 80, the gold wire 117 is bonded, the head slider 40 is affixed onto the head IC chip 60 and, finally, the gold ball 116 is put in place, completing assembly.

The affixing of the head slider 40 onto the top of the head IC chip 60 and the affixing of the head slider/head IC chip assembly 100 onto the top of the gimbal 81 of the suspension 80 are accomplished by applying a coating of adhesive agent and pressing the contact surfaces together. Accordingly, no air is trapped and so no air bubbles arise to weaken the bond, and thus the affixed members are strongly attached to their respective mounting areas.

A description will now be given of a head assembly according to a second embodiment of the present invention.

Figure 10:
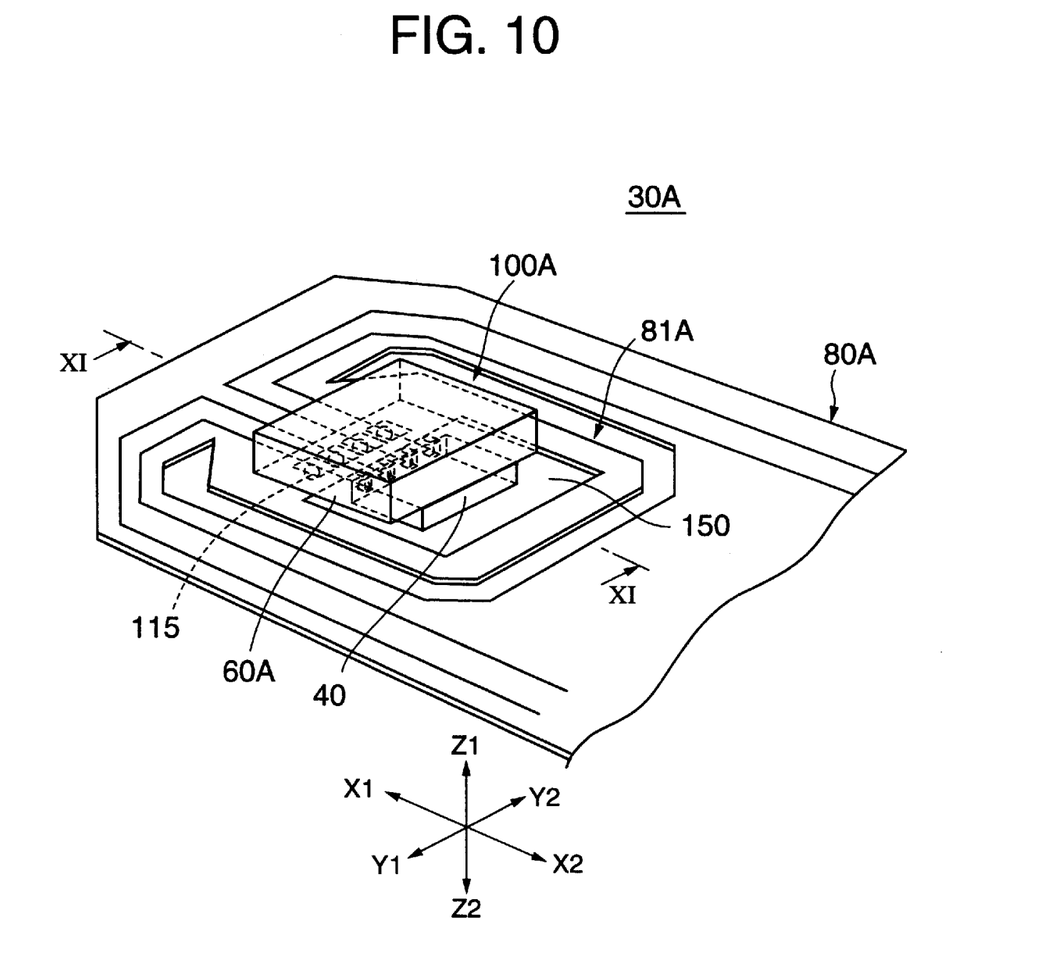
FIG. 10 is an enlarged oblique view of a head assembly according to a second embodiment of the present invention.
Figure 11:
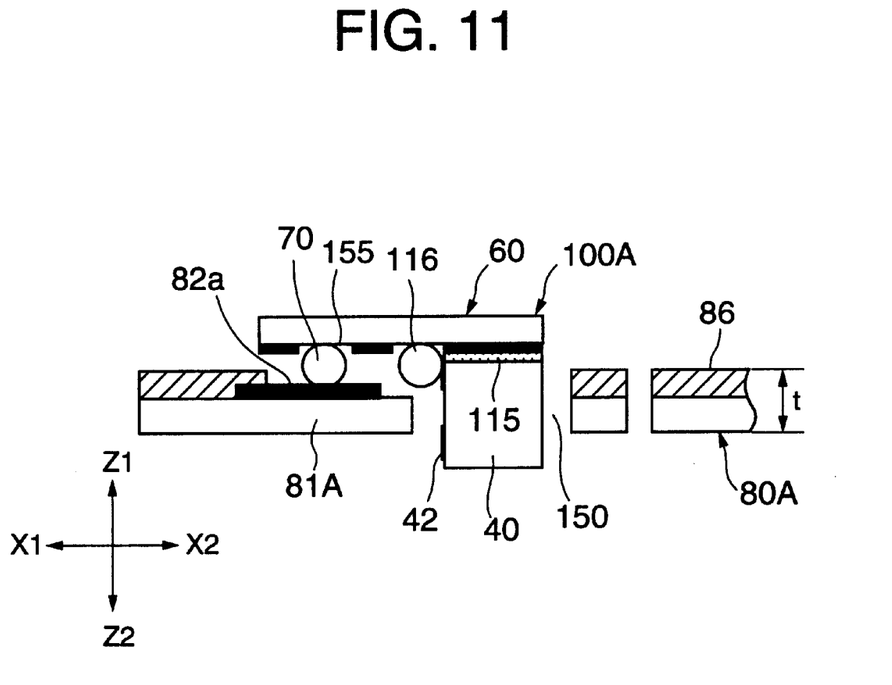
FIG. 11 is a cross-sectional view along a line XI—XI shown in FIG. 10.

FIG. 10 is an enlarged oblique view of a head assembly 30A according to a second embodiment of the present invention. FIG. 11 is a cross-sectional view along a line XI—XI shown in FIG. 10.

Figure 12:
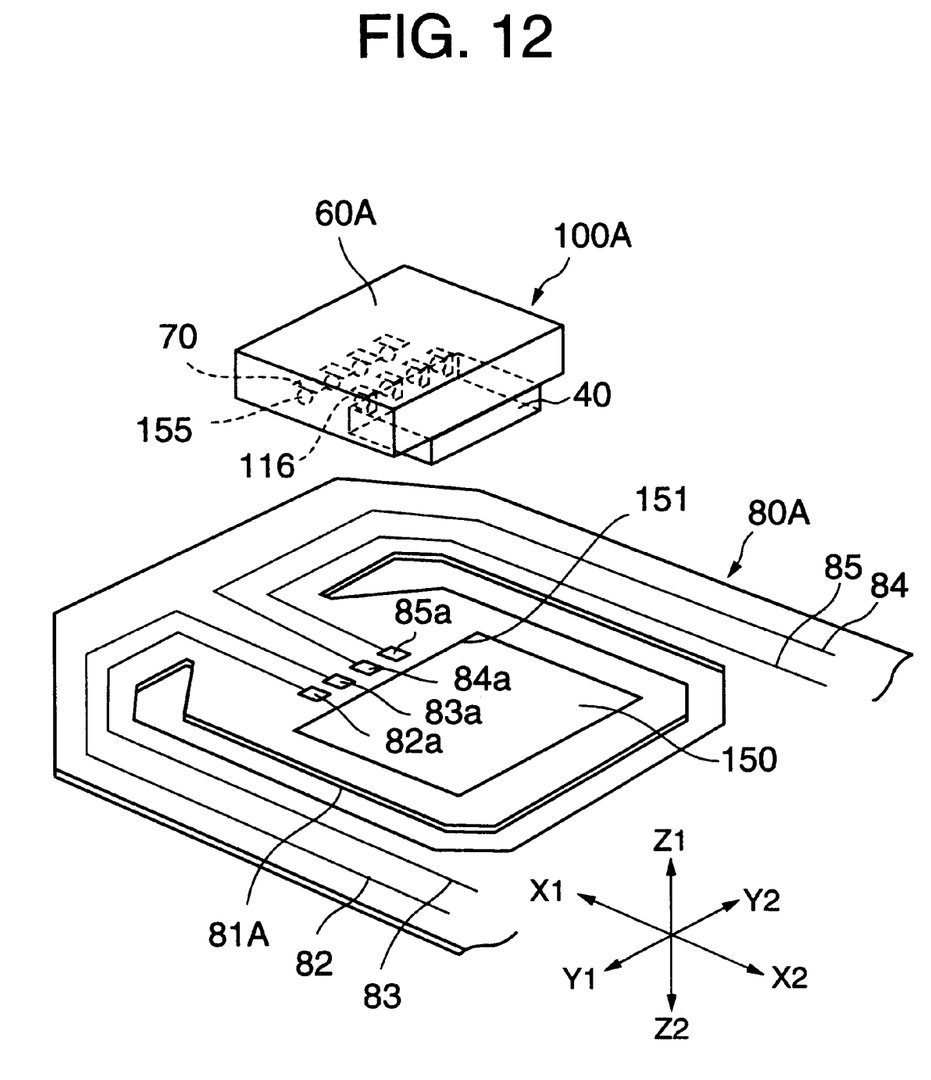
FIG. 12 is an exploded oblique view of the head assembly shown in FIG. 10.

FIG. 12 is an exploded oblique view of the head assembly 30A shown in FIG. 10.

The head assembly 30A has a suspension 80A and a head slider/head IC chip assembly 100A.

As shown in FIGS. 11 and 12, the suspension 80A has a gimbal 81A, the gimbal 81A having an opening 150 of a size corresponding to a size of the head slider 40. Electrodes 82a, 83a, 84a, 85a are aligned along one edge of the opening 150 in the Y1, Y2 direction.

The head slider/head IC chip assembly 100A is of a composition such that a gold bump 155 is formed on each of the suspension connecting electrodes 70, 71, 72, 73 described above with respect to the first embodiment.

The head assembly 30A is of a composition such that the head IC chip 60A is in a face-down flip-chip state, in which the gold bumps are connected to corresponding electrodes 82a, 83a, 84a, 85a and the head slider/head IC chip assembly 100 is mounted on the gimbal 81A. The head slider 40 is fitted into the opening 150 so as to project beyond the suspension 80A in a downward Z2 direction.

As shown in FIG. 11, a thickness t of the suspension 80 is included within a thickness of the head slider 40, so the head assembly 30A is thinner than for example the head assembly 30 shown in FIG. 6 by a margin equivalent to the thickness t of the suspension.

The above description is provided in order to enable any person skilled in the art to make and use the invention and sets forth the best mode contemplated by the inventors of carrying out their invention.

The present invention is not limited to the specifically disclosed embodiments, and variations and modifications may be made without departing from the scope and spirit of the present invention.

The present application is based on Japanese Priority Application No. 11-189282, filed on Jul. 2, 1999, the entire contents of which are hereby incorporated by reference.

What is claimed is:

1. A head assembly comprising:
   a head slider including a magnetic head and a first electrode;
   an IC chip supporting the head slider on a principal surface of the IC chip; and
   a suspension supporting the IC chip,
   the IC chip comprising a second electrode and a third electrode on the principal surface thereof, the third electrode being connected to the suspension, the second electrode being electrically connected to the first electrode.

2. The head assembly as claimed in claim 1, wherein:
   the IC chip has a size larger than a size of the head slider; and
   the second electrode and the third electrode are disposed outside an area for supporting the head slider.

3. The head assembly as claimed in claim 1, wherein the first electrode and the second electrode positioned at a right angle with respect to each other and electrically connected by a conductive member.

4. The head assembly as claimed in claim 3, wherein the conductive member is a gold ball.

5. The head assembly as claimed in claim 1, wherein the third electrode and the suspension are electrically connected by wire bonding.

6. The head assembly as claimed in claim 1, wherein the head slider and IC chip are affixed to each other by an adhesive agent, and the IC chip and the suspension are affixed to each other by an adhesive agent.

7. The head assembly as claimed in claim 1, wherein the suspension has an opening having a size corresponding to that of the head slider, the IC chip is constructed so that the third electrode and the suspension electrode are joined directly to each other, and the head slider projects through the suspension opening.

8. A disk drive comprising
   a recording medium;
   an arm driven by an actuator; and
   a head assembly that rotates together with the arm,
   the head assembly comprising:
     a head slider including a magnetic head and a first electrode;
     an IC chip supporting the head slider on a principal surface of the IC chip; and
     a suspension supporting the IC chip,
     the IC chip comprising a second electrode and a third electrode on the principal surface thereof, the third electrode being connected to the suspension, the second electrode being electrically connected to the first electrode.

9. The disk drive as claimed in claim 8, wherein:
   the IC chip has a size larger than a size of the head slider; and
   the second electrode and the third electrode are disposed outside an area for supporting the head slider.

10. The disk drive as claimed in claim 8, wherein the first electrode and the second electrode positioned at a right angle with respect to each other and electrically connected by a conductive member.

11. The disk drive as claimed in claim 8, wherein the conductive member is a gold ball.

12. The disk drive as claimed in claim 8, wherein the third electrode and the suspension are electrically connected by a wire bonding wire.

13. The disk drive as claimed in claim 8, wherein the head slider and IC chip are affixed to each other by an adhesive agent, and the IC chip and the suspension are affixed to each other by an adhesive agent.

14. The disk drive as claimed in claim 8, wherein the suspension has an opening having a size corresponding to that of the head slider, the IC chip is constructed so that the third electrode and the suspension electrode are joined directly to each other, and the head slider projects through the suspension opening.

15. An IC chip, the IC chip being mounted on a suspension and supporting a head slider including a magnetic head and a first electrode on a principal surface of the IC chip, the IC chip having a size larger than a size of the head slider, the principal surface of the IC chip including an area for supporting the head slider and a second electrode electrically connected to the first electrode of the head slider and a third electrode electrically connected to the suspension, the second electrode and the third electrode provided at an area outside the area for supporting the head slider.

* * * * *